United States Patent [19]

Shelton

[11] 4,175,378
[45] Nov. 27, 1979

[54] DECIMAL TIMEKEEPING INSTRUMENT

[76] Inventor: Vernon E. Shelton, 775 Battery St., Manhattan Beach, Calif. 90731

[21] Appl. No.: 603,795

[22] Filed: Aug. 12, 1975

Related U.S. Application Data

[63] Continuation-in-part of Ser. No. 443,728, Feb. 19, 1974, abandoned.

[51] Int. Cl.² .......................... G01D 9/00; G04B 19/24
[52] U.S. Cl. ......................................... 346/20; 58/6 R; 58/126 E; 58/152 R; 346/88
[58] Field of Search ............ 58/4 R, 58, 125 R, 125 C, 58/127 R, 152 R, 16 R, 24–26, 39.5, 74, 127 C, 126 E; 235/46, 61 R; 346/142, 20, 35, 49, 50, 53, 58, 59, 82, 86, 88, 144

[56] References Cited

U.S. PATENT DOCUMENTS

| | | | |
|---|---|---|---|
| 945,154 | 1/1910 | Ellis | 346/142 |
| 1,846,352 | 2/1932 | Ohmer et al. | 58/148 |
| 2,305,508 | 12/1942 | Woodruff | 58/43 |
| 3,116,102 | 12/1963 | Kleimeyer | 346/20 |
| 3,117,412 | 1/1964 | Malone | 58/126 |
| 3,628,322 | 12/1971 | McDuffee | 58/4 |
| 3,662,535 | 5/1972 | Hedrick et al. | 58/125 |
| 3,683,409 | 8/1972 | Barkas | 346/145 |

Primary Examiner—Edith S. Jackmon
Attorney, Agent, or Firm—Lyon & Lyon

[57] ABSTRACT

A timekeeping instrument is disclosed which is suitable for teaching a new system of timekeeping, namely, decimal time. By decimal time is meant the division of a day into decimal components rather than the conventional division of the day into hours, minutes and seconds. The teaching instrument disclosed has a single hand which corresponds to the hour hand of a conventional clock and the dial or face of the instrument bears indicia of the normal hourly divisions, that is, the twenty-four hours in a day. The face of the teaching instrument also bears indicia of the decimal divisions of the day. The face may also be provided with a digital display which presents a readout in decimal form of the precise time of day, and the day of the year. Another timekeeping instrument is disclosed which is suitable for timekeeping in decimal time. The instrument disclosed has a single hand and a dial or face having circumferentially disposed decimal divisions. There is also disclosed a time recording clock suitable for printing on a time card, such as those used in industry to record the time of arrival and departure of employees, a record of the decimal time such events occurred.

2 Claims, 4 Drawing Figures

U.S. Patent  Nov. 27, 1979  Sheet 1 of 2  4,175,378
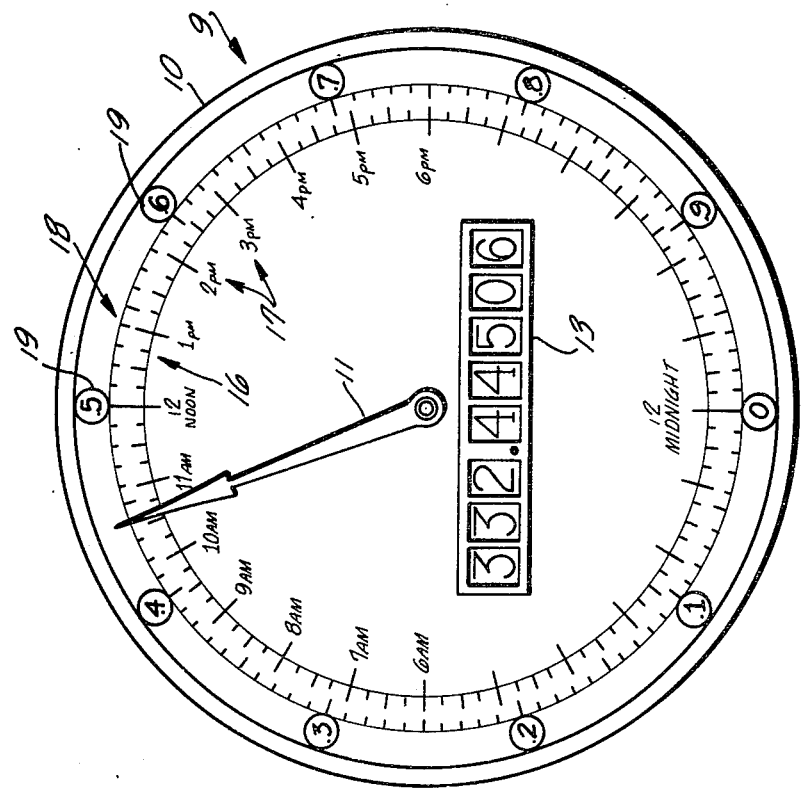

DECIMAL TIMEKEEPING INSTRUMENT

BACKGROUND OF THE INVENTION

This is a continuation-in-part of my copending application Ser. No. 443,728, filed Feb. 19, 1974 now abandoned.

The division of the day into hours, minutes and seconds, while established by centuries of custom and ingrained in the consciousness of almost every civilized person, is not always convenient for various mathematical calculations, particularly those dealing with rates involving time. Thus, common units of measurement such as cubic feet per minute, foot pounds per minute, horsepower hours, kilowatt hours, watt seconds, and BTU's per hour are required in the solution of many problems, but often involve a conversion from hours to minutes, minutes to seconds, or the like, which are, of course, possible but often inconvenient and which require considerable amounts of time and effort.

It is believed by the present inventor that a more convenient system of timekeeping, at least in many applications, would be a decimal system, that is, instead of dividing the day into twenty-four hours, and each of the hours into sixty minutes, and each of the minutes into 60 seconds, the day be divided into decimal divisions which would be more easily used in many mathematical relationships. Thus, the entire twenty-four hour day can be divided into ten units called decidays, each of these units divided into ten units called centidays, each of these units divided into ten segments called milidays, etc.

SUMMARY OF THE INVENTION

According to the present invention, a teaching timekeeping instrument is provided for displaying the time of day in both the conventional manner and in the proposed decimal manner. This is accomplished by providing a clock face having a first series of indicia indicating all twenty-four divisions of a day, and a second series of indicia indicating the corresponding decimal division of the day. The teaching timekeeping instrument is provided with a single hand which corresponds to the hour hand in a conventional clock and the hand traverses the face once in a twenty-four hour period. The instrument may be further provided with a digital display which reads out the time of day in decimal numbers. Another timekeeping instrument is provided for timekeeping in decimal time. The instrument has a single hand and a dial or face having circumferentially disposed decimal divisions. The hand traverses the face once in a twenty-four hour period, thereby indicating the time of day in decimal units. The timekeeping instruments of the present invention may also be adapted to use in a time clock so that a decimal indication of the time an employee arrives and departs his place of employment can be recorded on a time card.

It is therefore an object of the present invention to provide a timekeeping instrument for use in teaching the keeping of time in decimal units.

It is another object of the present invention to provide a timekeeping instrument for timekeeping in decimal time.

It is a further object of the present invention to provide a timekeeping instrument for recording time related events in decimal units.

BRIEF DESCRIPTION OF THE DRAWINGS

FIG. 1 is a front elevation of a teaching embodiment of the timekeeping instrument according to the present invention.

FIG. 2 is a side elevation of the timekeeping instrument of the present invention.

FIG. 3 is a side elevation, partly in cross section, showing the time recording instrument of the present invention.

DESCRIPTION OF THE DRAWINGS

Figure 4:
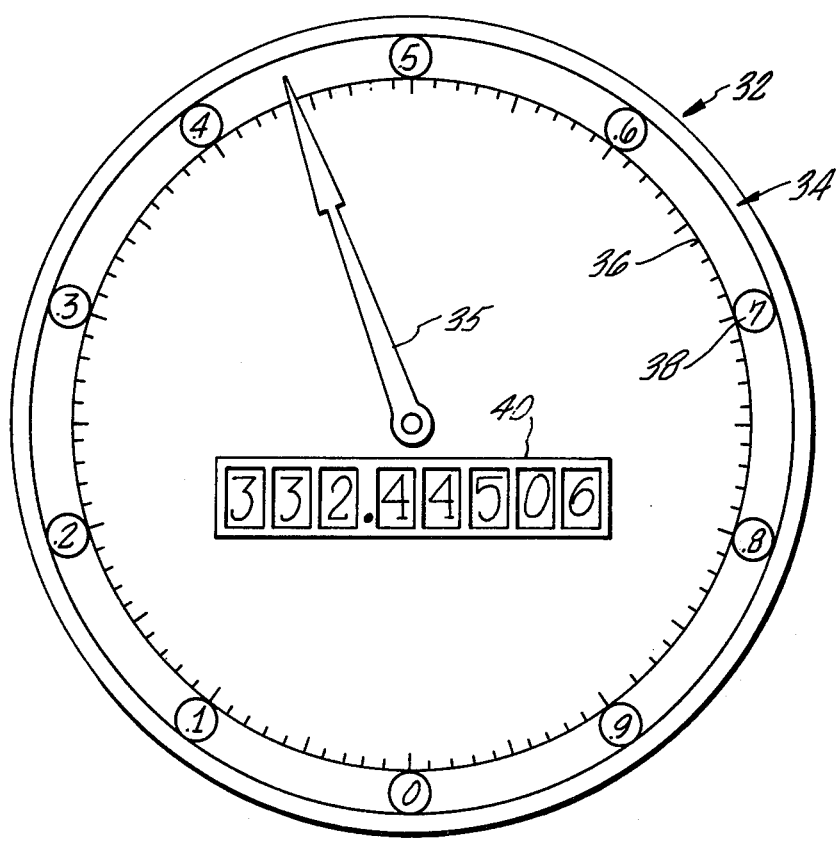
FIG. 4 is a front elevation of an alternative embodiment of a timekeeping instrument according to the present invention.

Turning now to FIGS. 1 and 2, there is illustrated a preferred embodiment of a teaching timekeeping instrument 9 according to the present invention. None of the details of the various mechanisms illustrated are shown, nor need they be described as they are completely conventional mechanical movements familiar to all those skilled in the art. As shown, the teaching timekeeping instrument is provided with a face plate 10 which is swept by a hand 11 driven by any conventional clock motor, either mechanical or electric. The only difference between the relationship between the hand 11 and the face 10 with that of a conventional clock is that the hand 11 makes a complete sweep of the face 10 in twenty-four hours rather than in the twelve hours conventionally employed. The face plate 10 is provided with a suitable aperture in which is mounted digital display 13 of a counter 14 of any conventional type, preferably one having eight decimal readout units. The counter 14 is preferably driven by the motor 12 through a gear train 15. It is to be understood, of course, that the counter 14 could be electronic rather than mechanical as will be obvious to those skilled in the art.

As can be seen in FIG. 1, the face plate 10 is provided with a first circular array 16 of indicia 17 which indicia represent the twenty-four hours of a conventional day. Positioned around the circular array 16 is a second circular array 18 bearing indicia 19 representing the same day but dividing it into ten major divisions. As can be seen, the start of the digital day coincides with twelve midnight while 0.5 day coincides with twelve noon. The spacing between the other decimal indicia, of course, corresponds to 2.4 hours.

As the hand 11 sweeps across the face of the face plate 10, it will display the time of day in both the conventional and the decimal systems. A more precise representation of the decimal time of day is given by the digital display 13, the first three digits of which preferably represent the day of the year and the second five digits represent the time of day. By using this timekeeping instrument, a person can familiarize himself with the decimal timekeeping system until he is able to visualize the time of day in decimal terms with the same facility that he can recognize it in terms of hours and minutes.

In FIG. 4 there is shown a timekeeping instrument 32 for dividing the day into decimal divisions. Again, none of the details of the various mechanisms illustrated are shown, nor need they be described as they are completely conventional mechanical movements familiar to all those skilled in the art. As shown, the timekeeping instrument 32 is provided with a face plate 34 which is swept by a hand 36 driven by any conventional clock motor, either mechanical or electric. Hand 36 makes a complete sweep of face 34 in a twenty-four hour period.

The face plate 34 is provided with a circular array 36 of decimal divisions 38. The decimal divisions are divided up into ten major divisions and the spacing between the major decimal divisions corresponds to 2.4 hours. As the hand 36 sweeps across the face 34, it displays the time in decimal units. Preferably, timekeeping instrument 32 is also provided with digital display unit 40. The first three digits of unit 40 preferably represent the day of the year and the second five digits represent the time of day. The digital display unit 40 gives a more precise indication of the decimal time of day.

Turning now to FIG. 3, there is shown a time recording instrument which is generally similar to those currently employed in industry for recording the arrival and departure of employees, the difference being that the instrument employs the timekeeping mechanism of FIGS. 1 and 2. As shown, the time recording instrument comprises a housing 20 having a slot 21 through which a time card 22 can be inserted to be stamped with a decimal number indicating the time of day at which the card was inserted in the instrument. Mounted in the housing 20 is a timekeeping instrument 9 identical in all respects to that illustrated in FIGS. 1 and 2. A second counter 23 is provided and is driven by the gear train 15 of the instrument 9. The counter 23 displays the same number as the display 13 but the numerals are raised, as shown at 24, for printout on the time card 22. Any suitable means of inking these raised numerals 24 can be provided, for example, a standard typewriter ribbon may be arranged to run between the raised numerals 24 and the time card 22.

The gear train 15 also drives a conventional drive mechanism 25 which periodically activates a threaded shaft 26 causing the follower 27 to move a support member 28 appropriately so that the printout will appear at the right area on the card 22. Preferably, the support 28 is counterbalanced by a suitable spring 29.

The support 28 carries a switch 30 which controls the operation of a solenoid 31. In operation, when the time card 22 engages a switch 30, the solenoid 31 is energized and presses the time card 22 against the raised numerals 24 of the counter 23 causing a decimal time indication to be printed on the card 22.

While an embodiment and application of this invention has been shown and described, it will be apparent to those skilled in the art that many more modifications are possible without departing from the inventive concepts herein described. The invention, therefore, is not to be restricted except as is necessary by the prior art and by the spirit of the appended claims.

I claim:

1. A timekeeping instrument for dividing the day into decimal divisions comprising:
   a face plate bearing a plurality of indicia which function to divide said face plate into decimal divisions;
   a hand mounted for movement relative to said face plate;
   means for driving said hand one complete revolution in one day;
   a display means mounted on said face plate for digitally displaying thereon the time of day in decimal divisions;
   means for receiving card means; and
   means for transferring to said card means a record of the display on said display means when said card means is received.

2. The instrument of claim 1 wherein said transferring means comprises second display means driven by said driving means, and wherein said transferring means includes means actuable by insertion of said card means into said card receiving means to bring said card means into engagement with said second display means.

* * * * *